United States Patent [19]

Hölzle

[11] Patent Number: 4,697,934

[45] Date of Patent: Oct. 6, 1987

[54] GUIDE MECHANISM, PARTICULARLY FOR SLIDING FURNITURE PARTS

[75] Inventor: Roland Hölzle, Haiterbach, Fed. Rep. of Germany

[73] Assignee: Häfele KG, Fed. Rep. of Germany

[21] Appl. No.: 831,972

[22] Filed: Feb. 20, 1986

[30] Foreign Application Priority Data

Feb. 20, 1985 [DE] Fed. Rep. of Germany ....... 3505786

[51] Int. Cl.$^4$ ............................................. F16C 29/04
[52] U.S. Cl. ......................................... 384/19; 384/55
[58] Field of Search ....................... 384/19, 17, 34, 55, 384/53

[56] References Cited

U.S. PATENT DOCUMENTS 3,221,691 12/1965 Laxo ..................................... 384/55
3,591,906 7/1971 Leiber .................................. 384/53

Primary Examiner—Lenard A. Footland
Attorney, Agent, or Firm—McGlew and Tuttle

[57] ABSTRACT

A guide mechanism for sliding furniture parts has an angled inner runner with an outer runner surrounding it. The inner runner and outer runner are designed so that two cages are formed that are essentially square or rectangular in dimension. In these cages are placed rolls that are positioned alternately to brace against two in each case opposing surfaces of the four total track surfaces existing.

15 Claims, 1 Drawing Figure

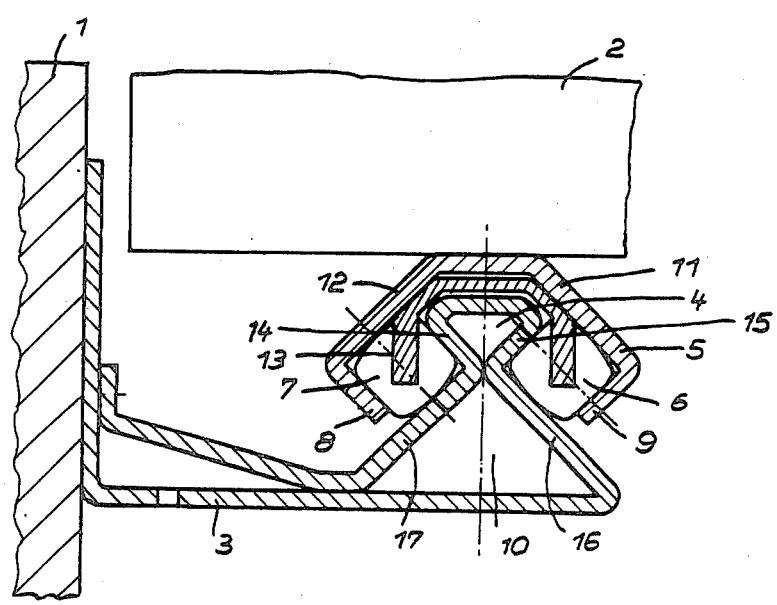

GUIDE MECHANISM, PARTICULARLY FOR SLIDING FURNITURE PARTS

FIELD AND BACKGROUND OF THE INVENTION

The present invention relates in general to slide-out guide mechanisms for drawers and the like, and in particular to a new and useful guide mechanism which includes four track surfaces haing cylindrical rollers engaged between pairs of the track surface.

Such slide-out guide mechanisms are generally known. One prior art ball-type slide-out mechannsm has an inner runner and a triangular-shaped outer runner enclosing the inner runner like a cage. The inner runner is also triangular-shaped, but has recesses on the three corners to admit balls. When a drawer, for instance, is pulled out, the balls run on the tracks provided for them, which are constituted by the inner track shape and the outer runner. The manufacture of slide-out guide mechanisms of this design, however, is relatively complicated. For one thing, specially designed inner track shapes are required, which are expensive to produce. For another thing, many balls are required to produce such a guide mechanism. This requires both high material costs and relatively difficult assembly.

SUMMARY OF THE INVENTION

The invention seeks to solve the problem of creating a guide mechanism that is made from the simplest and fewest possible commercially available parts.

Accordingly, an object of the present invention is to provide a guide mechanism for guiding two relatively movable parts, in particular for furniture, comprising an inner runner for connection to one of the parts, the inner having at least two track surfaces, an outer runner for connection to the other part, the outer runner having at least two track surfaces which at least partly cover the track surfaces of the inner runner, each track surface of the outer runner being parallel to and facing one track surface of the inner runner, the track surfaces defining a track space therebetween and a plurality of rollers each with a rotation axis disposed in the track space, each roller mounted for rolling against and between facing track surfaces of the inner and outer runners, the rollers being disposed in groups along the track surfaces with at least one roller in each group, and each group rolling against and between alternating track surfaces of the inner and outer runners.

Another object of the invention is to provide a pair of track spaces each defined by four track surfaces of the inner and outer runners, the axes of the rollers in the various groups alternating at 90° to each other along the track spaces.

There may be a single roller in each group so that the rollers alternate one after the other or a plurality of rollers may be provided in each group. The number of rollers in each group may also be equal or different depending on the load to be received by the track surfaces.

Since the inner and outer runners have parallel track surfaces, it is possible to place roughly cylindrical rollers between these two tracks. Thanks to the arrangement of parallel track surfaces, the inner and outer runners can be produced as simple bent pieces. This measure makes manufacturing considerably simpler. The use of the rollers makes it possible to fill the space between the inner and outer runners simply, in such a way that the rollers are braced alternately, individually or in groups or bunches, against two in each case of the four tracks, in order to achieve good control. This measure, which can be achieved simply by a turn of 90° when the rollers are being fed in, makes it possible for the first time to have support on four sides with one track.

The manufacture of the rollers is particularly easy if they are nearly square in cross-section, i.e., isomorphous. When feeding in the rollers, then, only one kind of roller is required.

A particularly significant advantage of the invention is that by the bending of the inner runner and the enlosing outer runner, only two roller areas are created that need to be filled. The number of rollers needed is therefore considerably reduced in comparison to prior art designs using balls. This makes for considerable material savings, while because of the special arrangement of the rollers equivalent or even improved stability is achieved. This does not rule out the possibility, however, of creating three or more roller areas for cases of exacting requirements. It is particularly advantageous when the two roller areas are essentially opposite one another, thus allowing for an equal distribution of force. If, however, specific loads are absorbed, it is possible to arrange the roller areas at different angles to one another so that optimum absorption of the load is achieved.

The manufacture of the guide mechanism is rendered particularly easy if the inner runner is made out of one piece, where the piece that fits inside the outer runner is bent into essentially a triangular form and the sides of the triangle constitute the track surfaces, at least in part. In this process the inner runner can be produced in one operation.

The production process can be further simplified if the rollers are alternated in bunches or groups to brace against two in each case of the four track surfaces. An alternating arrangement with a with a 90° differential is then no longer required, since bunches of two or more rollers in the same position can be fed into the cage. In order to meet special load requirements, it can be useful to have the number of rollers in group differ from the number of the next group. In this way, the tracks with the heaviest load are supported by more rollers than the less heavily ladened tracks of a cage.

Accordingly a further object of the present invention is to provide a guide mechanism, particulary for furniture, which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWINGS

The only FIGURE of the drawing shows one embodiment of the invntion in a cross sectional view.

DESCRIPTION OF THE PREFERRED EMBODIMENT

Referring to the drawing, 1 designates the wall of a furniture part. An inner runner 3 is attached to the furniture part. The inner runner 3 is constructed as a single bent piece. Under an outer runner 5 the bent piece takes the form of an isosceles triangle 10. On top of this isosceles triangle is another isosceles triangle 4 that is fully covered by the outer runner 5. The outer funner 5 also surrounds a portion of the larger isosceles triangle 10. The sides of the triangles 4 and 10, which touch at their right angles, together create a 90° angle.

The sides of the outer runner 5 are bent in such a way that sides 8 and 9 lie parallel to sides 14 and 15 of triangle 4. Similarly, sides 11 and 12 of the outer runner 5 are parallel to sides 16 and 17 of triangle 10. Two tracks are thus created that are filled with rollers 6 and 7. The rollers 6 and 7 are roughly cylindrical and are preferably about equal in length and diameter and are loaded alternately along the length of runners 3 and 5 (perpendicular to the plane of the drawing) with their axes perpendicular to one another, so that at one point the tracks are formed by sides 16 and 17 of triangle 10 and sides 11 and 12 and at another point by sides 14 and 15 of triangle 4 and sides 8 and 9 of the outer runner 5. The drawing shows the rollers 6 and 7 to have parallel axes. The rollers under these would have parallel axes but at 90° to the axes shown. What this achieves is support that is both on the sides and underneath. It is not absolutely necessary to load the rollers alternately at 90° angles each time. In order to simplify the loading procedure, it is also possible to introduce the rollers in groups or bunches at the same angle, so that, for example, there are always three rollers one after the other in the same direction.

If it is anticipated that the force in one direction will be greater than in the other direction, one can refrain from dividing the rollers on one track evenly, instead inserting more rollers for the track surfaces that are subject to greater load. The part that is to slide out, a drawer 2, for example, is then supported on or connected to the outer runner 5.

The rollers 6 and 7 are held in a single cage 13 that is positioned between triangle 4 and sides 11 and 12.

With a different arrangement of the inner and outer runners, it is possible to place the rollers at a great variety of angles, which need not necessarily be symmetrical. Depending on the shape of the cages created, it is also possible to have rollers 6 and 7 be longated.

While a specific embodiment of the invention has been shown and described in detail to illustrate the application of the principles of the invention, it will be understood that the invention may be embodied otherwise without departing from such principles.

I claim:

1. A guide mechanism for guiding two relatively movable parts, in particular for furniture, comprising an inner runner for connection to one of the parts, said inner runner having at least two track surfaces, an outer runner for connection to the other part, said outer runner having at least two track surfaces which at least partly cover said track surfaces of said inner runner, each track surface of said outer runner being parallel to and facing one track surface of said inner runner, said track surfaces of said inner and outer runners together defining a track space, and a plurality of rollers in said track space, each roller having a rotation axis and each mounted for rolling against and between facing track surfaces of said inner and outer runners, said rollers being disposed in groups along said track space with at least one roller in each group, and each group rolling against and between alternating track surfaces of said inner and outer runners along said track space, said inner and outer runners each have two additional track surfaces with each additional track surface of said outer runner being parallel to and facing one additional track surface of said inner runner, said additional track surfaces defining an additional track space, said inner runner having a top triangle portion defining two track surfaces of said inner runner, said outer runner engaged over said top triangle portion and defining with said top triangle portion said first mentioned and additional track spaces.

2. A gude mechanism according to claim 1, wherein each roller is roughly cylindrical and has an axial length approximately equal to its diameter.

3. A guide mechanism according to claim 1, wherein said first mentioned and additional track spaces are on opposite sides of said top triangular portion.

4. A guide mechanism according to claim 1, wherein said inner runner comprises a one piece member which is bent to form said top triangular portion.

5. A guide mechanism according to claim 1, wherein the number of rollers in one group is different from the number of rollers in a succeeding group along said track surface.

6. A guide mechanism according to claim 1, including a single cage disposed in said track space for retaining said rollers in said track space.

7. A guide mechanism according to claim 1, wherein said track surfaces of said inner runner contact each other at a bend and extend at 90° to each other, said track surfaces of said outer runner contacting each other at a bend and extending at 90° to each other, said rollers each having an axial length which is substantially equal to its diameter, and the axis of rollers in each group extending at 90° to the axis of rollers in a succeeding group in said track space, said track space having a rectangular cross section.

8. A guide mechanism according to claim 7, wherein each group contains a single roller.

9. A guide mechanism according to claim 7, wherein each group contains a plurality of rollers.

10. A guide mechanism according to claim 7, wherein each group contains a different number of rollers from a succeeding group in said track space.

11. A guide mechanism according to claim 7, wherein each of said inner and outer runners has two additional track surfaces defining an additional track space, a plurality of rollers in said additional track space disposed in groups with at least one roller in each group, each group rolling against and between alternating additional track surfaces of said inner and outer runners along said additional track space.

12. A guide mechanism according to claim 11, wherein said inner runner includes a lower triangular portion having an upper apex and an upper triangular portion having a downwardly pointing apex connected to said upper apex of said lower triangular portion, said upper and lower triangular portion defining said first mentioned and additiona track surfaces, said outer runner being engaged over and at least partly enclosing said upper triangular portion for defining said first mentioned and additional track spaces.

13. A guide mechanism according to claim 12, wherein said inner runner is made of a single member which is bent to form said upper and lower triangular portions.

14. A guide mechanism according to claim 13, wherein said outer runner is made of a single piece bent to form said track surfaces thereof.

15. A guide mechanism according to claim 14, including a one piece cage over said upper triangular portion and below said outer runner, said cage being shaped to confine rollers in said first mentioned additional track spaces.

* * * * *